US012732436B2

(12) United States Patent
Oliveira et al.

(10) Patent No.: US 12,732,436 B2
(45) Date of Patent: Sep. 8, 2026

(54) REPUTATION MECHANISM TO SUPPORT TRUSTFUL INTERACTIONS OF AUTONOMOUS PROVIDERS IN EDGE ENVIRONMENTS

(71) Applicant: Dell Products L.P., Round Rock, TX (US)

(72) Inventors: Ana Cristina Bernardo de Oliveira, Rio de Janeiro (BR); Antonio Augusto de Aragão Rocha, Niterói (BR); Evandro Luiz Cardoso Macedo, Rio de Janeiro (BR); Flavia Coimbra Delicato, Niterói (BR); Paulo de Figueiredo Pires, Niterói (BR); Rayan Gustavo Oliveira Jucá Lima, Rio de Janeiro (BR); Thais Vasconcelos Batista, Natal (BR); Thiago Pereira da Silva, Barra do Garças (BR)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 18/752,668

(22) Filed: Jun. 24, 2024

(65) Prior Publication Data

US 2025/0392527 A1 Dec. 25, 2025

(51) Int. Cl.
*H04L 41/5003* (2022.01)
*H04L 41/5067* (2022.01)

(52) U.S. Cl.
CPC ...... *H04L 41/5003* (2013.01); *H04L 41/5067* (2013.01)

(58) Field of Classification Search
CPC ........................ H04L 41/5003; H04L 41/5067
See application file for complete search history.

(56) References Cited

U.S. PATENT DOCUMENTS

2014/0056149 A1* 2/2014 Mani ........................ H04L 47/12 370/235
2014/0129710 A1* 5/2014 Bartfai-Walcott ...... H04L 67/61 709/224

(Continued)

OTHER PUBLICATIONS

G. Kibalya, J. Serrat-Fernandez, J.-L. Gorricho, D. G. Bujjingo and J. Serugunda, "A Multi-Stage Graph Aided Algorithm for Distributed Service Function Chain Provisioning Across Multiple Domains," in IEEE Access, vol. 9, pp. 114884-114904, 2021, doi: 10.1109/Access.2021.3104841.

(Continued)

*Primary Examiner* — Farzana B Huq
(74) *Attorney, Agent, or Firm* — Workman Nydegger

(57) ABSTRACT

A method for improving provision of computing services to a customer, including monitoring computing services provided by a computing services provider to the customer comprising an edge system that comprises hardware and/or software, gathering data concerning the computing services received by the customer, applying a distance function to the data to determine to what extent, if any, the computing services diverge from computing services specified for the customer, as defined by a QoS requirement of an SLA agreed upon by the customer and the computing services provider, based on results of the applying of the distance function, applying a reward function to determine a reward for the computing services provider, and when applying of the distance function indicates that the computing services provided to the customer do not meet the computing services specified in the QoS requirement, automatically triggering a change in the computing services provided to the customer.

20 Claims, 5 Drawing Sheets

(56) References Cited

U.S. PATENT DOCUMENTS

| | | | | |
|---|---|---|---|---|
| 2023/0144248 | A1* | 5/2023 | Huang | H04L 67/61 709/224 |
| 2023/0327962 | A1* | 10/2023 | Kattepur | G06Q 10/06393 455/414.1 |
| 2024/0097996 | A1* | 3/2024 | Liu | H04L 41/0895 |
| 2025/0203444 | A1* | 6/2025 | Sathish | H04W 36/22 |
| 2025/0330393 | A1* | 10/2025 | Ahmed | H04L 47/24 |

OTHER PUBLICATIONS

Y. Liu, H. Zhang, D. Chang and H. Hu, "GDM: A General Distributed Method for Cross-Domain Service Function Chain Embedding," in IEEE Transactions on Network and Service Management, vol. 17, No. 3, pp. 1446-1459, Sep. 2020, doi: 10.1109/TNSM.2020.2993364.

G. Sun, Y. Li, D. Liao and V. Chang, "Service Function Chain Orchestration Across Multiple Domains: A Full Mesh Aggregation Approach," in IEEE Transactions on Network and Service Management, vol. 15, No. 3, pp. 1175-1191, Sep. 2018, doi: 10.1109/TNSM.2018.2861717.

Kochovski, P., Stankovski, V., Gec, S. et al. Smart Contracts for Service-Level Agreements in Edge-to-Cloud Computing. J Grid Computing 18, 673-690 (2020). https://doi.org/10.1007/s10723-020-09534-y.

Jorquera Valero, J.M., Sánchez Sánchez, P.M., Lekidis, A. et al. Design of a Security and Trust Framework for 5G Multi-domain Scenarios. J Netw Syst Manage 30, 7 (2022). https://doi.org/10.1007/s10922-021-09623-7.

José María Jorquera Valero, Pedro Miguel Sánchez Sánchez, Manuel Gil Pérez, Alberto Huertas Celdrán, and Gregorio Martinez Perez. 2023. Cutting-Edge Assets for Trust in 5G and Beyond: Requirements, State of the Art, Trends, and Challenges. ACM Comput. Surv. 55, 11, Article 222 (Nov. 2023), 36 pages. https://doi.org/10.1145/3572717.

* cited by examiner

REPUTATION MECHANISM TO SUPPORT TRUSTFUL INTERACTIONS OF AUTONOMOUS PROVIDERS IN EDGE ENVIRONMENTS

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to edge environments and associated entities and operations. More particularly, at least some embodiments relate to systems, hardware, software, computer-readable media, and methods, for implementing and using reputation mechanisms to support trustful interactions of autonomous providers in edge environments.

BACKGROUND

In edge computing environments, the utilization of the Network Function Virtualization (NFV) paradigm enables network service providers to offer services in a virtualized manner, which leverages scalability and provisioning capabilities. The combination of this paradigm with edge computing allows deploying and instantiating virtual services on edge devices. In this way, it is possible to take advantage of the flexibility of the NFV paradigm and the promise of lower latency of the edge paradigm. Through the chaining of Virtualized Network Functions (VNFs), thus creating a Service Function Chain (SFC), providers can manage flows of network functions between multiple edge devices. Nevertheless, in a constantly changing environment, ensuring that the SFC execution properly meets the required quality of service (Qos), while optimizing the utilization of provider resources is challenging. Besides meeting the end user service requests, there is a need for mechanisms to assure that the QoS parameters are being satisfied according to what was defined in service-level agreements (SLA) and to associate a metric that translates such behavior. Such a measurable degree of satisfaction in terms of effectively providing what was promised can be used as a way of establishing the reputation of a provider.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
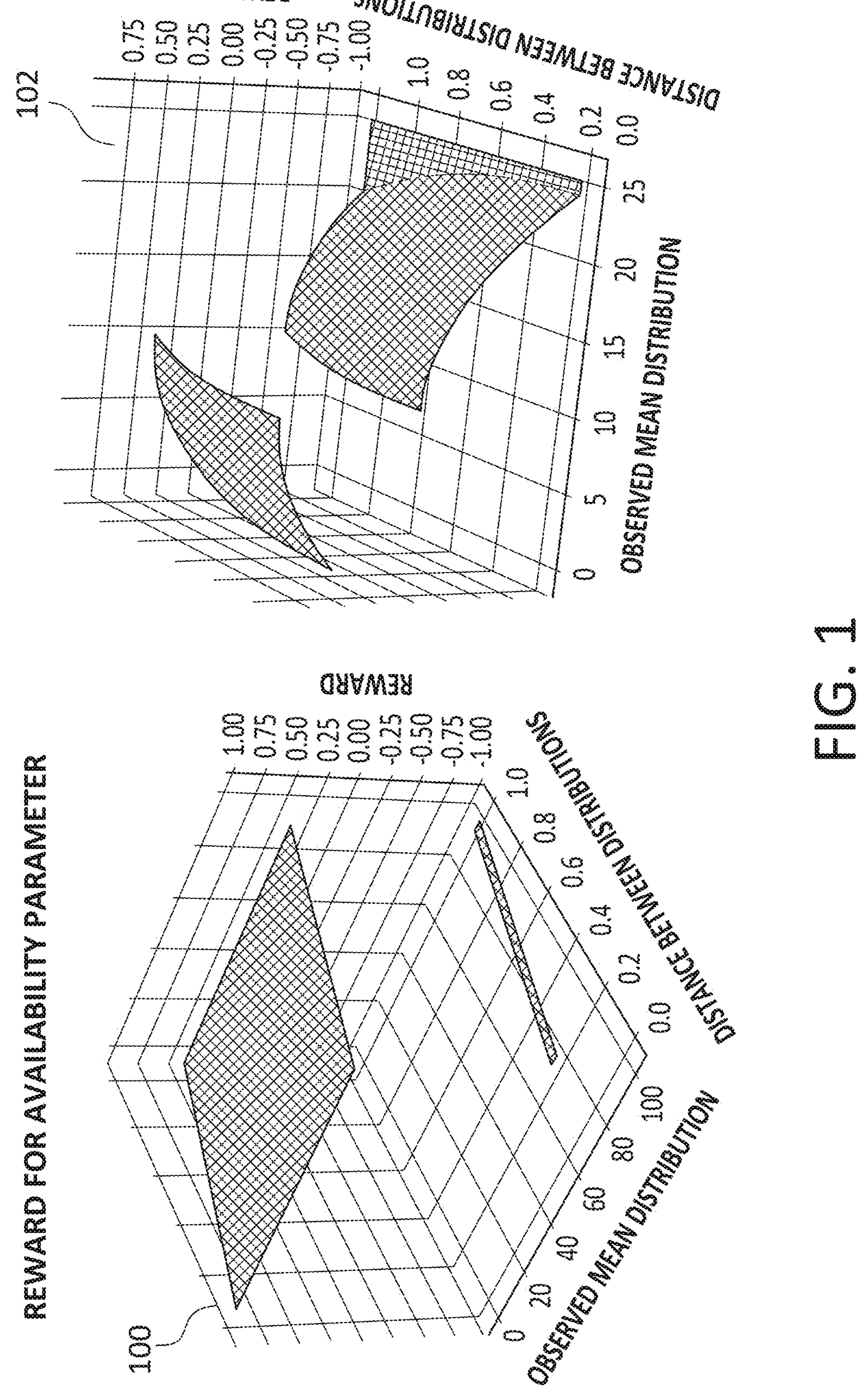
FIG. 1 discloses aspects of an example reward function for availability and latency, according to one embodiment.

Embodiments disclosed herein generally relate to edge environments and associated entities and operations. More particularly, at least some embodiments relate to systems, hardware, software, computer-readable media, and methods, for implementing and using reputation mechanisms to support trustful interactions of autonomous providers in edge environments.

It is noted that while some embodiments may be implemented in connection with an edge environment, the scope of this disclosure is not limited to such environments. For example, in one embodiment, services of a service provider may be instantiated and run in an edge environment, and/or the services may be instantiated and run in a cloud environment. Where services are instantiated and run in an edge environment, the services may, or may not, be hosted on a common local network with one or more edge sites that employ the services.

One example embodiment includes a method for evaluating how closely the computing services provided by a network service provider conform to the computing services required and agreed to by a customer, such as an edge system or device, of the network service provider. Such computing services may comprise or take the form of VNFs either alone, or in a SFC. Example computing services may be evaluated in terms of, for example, the availability of a computing resource to the customer when needed, and latency in communication experienced by the customer when using, or attempting to use, a technical service provided by the network service provider. Some examples of computing services include, but are not limited to, processing, computing, and data storage.

In an embodiment, one example of such a method may comprise the following operations: monitoring computing services provided by a network service provider to a customer comprising an edge system or device; using a distance function to determine to what extent, if any, the provided computing services diverge from computing services specified for the customer, as defined by a QoS specified by the customer; using a reward function to determine, depending on results of application of the distance function, a reward for the network service provider; assigning the reward to the network service provider; and, when divergence of the provided computing services from the computing services needed by the customer exceeds an acceptable margin, modifying, or causing the modification of, an SFC associated with the customer so that services provided to the customer in connection with the modified SFC are acceptably close to the computing services specified for the customer, and enable the customer to better execute an edge function.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that a performance evaluation of a network service provider may be used as a basis to improve the quality of the computing services provided to a customer. In an embodiment, a distance function may be used to determine an extent to which, if any, computing services provided by a network service provider diverge from requirements specified in an SLA. In an embodiment, a reward function may be used to influence a reputation of a network service provider based on conformance of the computing services provided with requirements specified in an SLA. Various other advantages of one or more example embodiments will be apparent from this disclosure.

A. Context for an Example Embodiment

One embodiment comprises an approach to deal with the lack of a reputation mechanism to measure the compliance of QoS parameters with service level agreements (SLA). As such, an embodiment may provide an approach for dealing with at least the following areas of interest: how to provide a reputation mechanism that assesses the quality of services that are effectively being provided; and, how to provide a fine-tuned reputation mechanism that supports customizations according to specific user/application needs.

A.1 QoS Compliance in the Presence of Autonomous Providers in Edge Environments One important challenge in service provisioning is the maintenance of the Qos parameters during the lifetime of service execution. It relies on guaranteeing that providers comply with all the requirements specified in the SLA made with the end user. Whenever a provider does not deliver the service with the expected, and agreed upon, performance level, then the provider may be penalized in some manner. Likewise, if the provider offers the service exactly as agreed, the provider may be rewarded. It is challenging to keep track of Qos parameters without a logically centralized solution to monitor and regulate service provisioning and infer a metric that can assure the compliance of the providers, given that they are autonomous. Hence, keeping track of whether a provider meets or fails to meet promised quality values can be used as a way of calculating a reputation value for that provider. Such a reputation metric can be used to decide which provider is better than others for delivering certain services. Therefore, an embodiment may comprise an intelligent mechanism that can capture the nuances of QoS parameters and translate them into a meaningful reputation mechanism.

A.2 Customizable and Fine-Tuned Reputation Mechanism

Recent applications require flexible configurations to meet specific demands that constantly change over time and maintain performance levels accordingly. To keep track of such performance levels, SLA management solutions are developed to assess the QoS parameters of the systems, considering the lifecycle management of the SLA. Nevertheless, SLA management solutions typically involve rigid approaches in which parameters are set and cannot be changed or customized anymore, neither by providers nor users. As such, an embodiment may comprise a customizable and fine-tuned mechanism that can cover the specificities of user applications and provider services in terms of which characteristic is more important than others. Such customization can enable providers and users to adjust the weighting parameters and choose which characteristic may be more important in the decision-making process of rewarding the service delivery performance of a provider.

B. Overview of Aspects of One Embodiment

In Edge Computing environments, the common utilization of Network Function Virtualization (NFV) paradigm enables network service providers to offer services in a virtualized manner, which leverages scalability and provisioning capabilities. The combination of this paradigm with edge computing allows deploying and instantiating virtual services on edge devices. In this way, it is possible to take advantage of the flexibility of the NFV paradigm and the promise of lower latency of the edge paradigm.

Through the chaining of Virtualized Network Functions (VNFs), which creates a structure known as a Service Function Chain (SFC), service providers can manage flows of network functions between multiple edge devices and compound different types of customized services. Nevertheless, in a constantly changing environment, ensuring that the execution of the SFC meets the required quality of service (Qos), while optimizing the utilization of provider resources is challenging.

Besides meeting the end user service requests, there is a need for mechanisms to assure that the QoS parameters are being satisfied according to what was defined in service-level agreements (SLA). There are several steps, from establishing a service agreement to providing the service itself. Such steps may be monitored and managed by appropriate mechanisms and described as an SLA management life cycle. An example SLA management lifecycle may comprise the following operations:

- Service Provider Discover: the users identify which provider can deliver the necessary resources that meet their needs;
- SLA Definition: this step often involves a negotiation between provider and customer, in which they negotiate the terms and target performance level for the services to be provided;
- Establish Agreement: the definition and development of the template in which the terms defined during SLA Definition are going to be placed;
- SLA Violation Monitoring: the monitoring of the service is vital to detect whether the provider is meeting the defined performance level;

Terminate SLA: depending on the terms defined in SLA Definition, the termination of an SLA happens when the SLA validity has expired or when an SLA violation is detected; and Enforce Penalties for SLA Violation: if the provider fails to meet any agreed term, then the user must be compensated in some way.

Additionally, it is also challenging to create and assign to each provider a metric that can capture the variations of service delivery QoS parameters. Thus, an embodiment comprises an approach for monitoring monitor the behavior of a provider in terms of service provision and translating such a behavior into a significative metric. Such a measurable degree of satisfaction in terms of effectively providing what was promised may be used as a way of establishing the reputation of a provider.

At least in light of considerations such as those noted above, an embodiment may overcome various challenges in a virtualized edge computing environment by implementing an approach encompassing a fine-tuned reputation mechanism with weighted metric based on the expected value (mean) of QoS parameters and the divergence of their distributions.

C. Detailed Discussion of Aspects of One Embodiment

One example embodiment comprises a reputation mechanism based on the divergence of distributions of QoS parameters to assure that autonomous providers are properly meeting the QoS values according to what was agreed in the SLA. The following subsections describe one example reputation mechanism in the presence of autonomous providers, and a use case that exemplifies the functioning of one embodiment of a reputation mechanism.

C.1 Reputation Mechanism in the Presence of Autonomous Providers

In modern applications, it is important to achieve the QoS (Quality of Service) parameters as close as possible to what is needed by applications to fulfill the desired performance requirements. To provide a certain level of guarantee that such QoS parameters are being met, users and providers stipulate to a Service Level Agreement (SLA). With the SLA set, the QoS parameters may be constantly monitored by some component that compares the observed values against the values agreed to. Keeping track of SLA satisfaction by providers in terms of effectively delivering services according to the agreed can be used as a metric to establish, maintain, and/or modify, the reputation of a provider. The provider reputation may be calculated based on the measured QoS parameters while services are being provisioned, in which a provider is positively rewarded if it follows the predefined QoS values stipulated in the SLA, and negatively rewarded, or punished, otherwise.

It should be understand that, for specific services and applications, predictability of how the service is delivered is relevant. Although delivering services with QoS parameter values better than agreed upon is normally considered more advantageous for users, this is not always the case. In several scenarios, QoS parameter values better than agreed upon might cause either bottlenecks or overloads in some parts of services, which are not normally captured by SLA monitors. In one embodiment then, providing better QoS than agreed should not be a reason for rewarding a provider. Therefore, if QoS values are far from what was agreed, whether above or below, the service provider in question receives less reward than if it had provided a service with a quality closer to what was specified in the SLA.

For instance, if the SLA defines a delay requirement to be exactly 10 ms, the provider will receive a higher reward if the observed delay is 10 ms than if the delay is 5 ms, even though a shorter delay may intuitively seem better. To accommodate such specific situations of consumers expecting a predictable service, specifically meeting the SLA-defined values, one embodiment may compare the average of the delivered distribution with the average agreed to in the SLA. Furthermore, an embodiment may also evaluate the distance between the probability distributions to provide a metric of how significant the divergence is between what is observed, and what was stipulated. In an embodiment, to receive a reputation reward closer to the maximum, the provider must deliver the service with the distribution of QoS values closer to the distribution established in the SLA.

To ensure that a reward function only returns values in the range $[-1,1]$, an embodiment may look for a distance function d such that $\mathrm{Im}(d) \subset [0,1]$. If d does not have this property, an embodiment may use a normalization $N: \mathrm{Im}(d) \rightarrow [0,1]$, such that $x > y \in \mathrm{Im}(d)$ implies $N(x) > N(y)$. It is noted with respect to the foregoing, and the discussion below, that the function E below is related to the expected value of a random variable. For example, E[X], is the expected value of the random variable X. Further, Im is the image of a function. For example, Im(f), is the image of the function f.

Therefore, to calculate a provider reward, an embodiment may analyze the average of the QoS parameters delivered during the execution of the service and the distance between the promised distribution (SLA) and the delivered one. For example, let P, Q be probability distributions and d a distance function between probability distributions. If P is the distribution agreed in the SLA and Q is the distribution delivered during the execution of the respective service, an embodiment may ensure that a reputation reward function r(P, Q) has the following properties (1), (2) and (3):

1. If $P = Q$, then $r(P, Q) = 1$.

2. If $E[Q] \leq E[P]$, then $r(P, Q) > 0$.

3. If $d(P, Q) = 0$ and $E[Q] > E[P]$, then $r(P, Q) \leq 0$.

Property (1) means that the provider receives the greatest reward when it delivers exactly what was agreed in the SLA. Ensuring properties (2) and (3) means that providers that deliver a service with a lower average are rewarded positively, and those that deliver a service with a higher average are negatively rewarded. Although it is usually better to have lower latency averages, for example, this is not necessarily always the case for all QoS parameters. For example, in many of the parameters, it may be preferable to receive averages higher than agreed upon instead of lower averages, as in the availability parameter, for example. In these cases, an embodiment may invert the order relationship of the reputation reward with 0 in (2) and (3). For that, an embodiment may take the reputation reward given to the provider to $-r(P, Q)$. Thus, when the provider delivers a service with a lower average for a given QoS parameter, the provider will be negatively rewarded and, when it delivers a higher average, it is positively rewarded.

Furthermore, to ensure fairness in the reputation mechanism, an embodiment may employ a reward range of $[-1, 1]$. This means that the provider that best meets user expectations receives a reward closer to the maximum value of 1.

Conversely, a provider with the worst performance in providing the service receives a reward closer to the minimum value of −1. In addition to flagging reputation reward values positively or negatively, an embodiment may establish a range over which the reputation reward may vary.

An embodiment may comprise a reward function r defined to compute the reputation of a provider for a given QoS parameter. In particular, let d be a distance function between probability distributions, such that $Im(d) \subset [0, 1]$. An embodiment may model the reward function r as follows:

$$r(P, Q) = \alpha f(E[Q]) + (1-\alpha)g(d(P, Q)),\ 0 \le \alpha \le 1,$$

where $f$ is the function that evaluates the mean of the delivered distribution and g is the function that evaluates the distance between the P and Q distributions.

To ensure that the reward function r is well-defined, one embodiment may impose some restrictions on $f$ and g as follows:

A. $Im(f) \subset [-1, 1]$ and $Im(g) \subset [0, 1]$;

B. $f$ is non-decreasing in [0, E[P]] and non-increasing in $Dom(f) \backslash [0, E[P]]$; and C. g is non-increasing.

Here, the restriction (A) guarantees $Im(r) \subset [-1,1]$. The other restrictions (B) and (C) ensure that the reward is given fairly, following the previously mentioned properties. Thus, for each $f$, g, α, an embodiment may obtain a different reward function. In this model, an embodiment may cover numerous scenarios considering different approaches for choosing a provider with different reward function. In the SLA definition step, the provider and end user define, for each QoS parameter, the probability distribution that the parameter values must follow. In addition, they also define, for each QoS parameter, functions $f$, g, and a scalar a function r.

Theorem II, below, shows that the reward function returns better rewards to providers that follow the SLA and deliver the service with the closest performance levels to the agreed one. Furthermore, the further away from the agreement, the worse the reputation reward given to the provider. Theorem II may be proven using Theorem I, as shown below.

THEOREM I: Every limited monotonic sequence is convergent (see Y. Liu, H. Zhang, D. Chang and H. Hu, "*GDM: A General Distributed Method for Cross-Domain Service Function Chain Embedding*," in *IEEE Transactions on Network and Service Management*, vol. 17, no. 3, pp. 1446-1459, September 2020, doi: 10.1109/TNSM.2020.2993364), incorporated herein in its entirety by this reference.

In particular, let $n \subset \mathbb{N}$. Consider $Q_n$ as a probability distribution such that $E[Q_n]=E[P]+I_P(n)$ and $d(P, Q_n)=J(n)$, where $I_P$ and J are increasing functions that represent increments in the value where r returns the best reputation reward (r(P, P)).

Theorem II. The example reputation reward function, r, has the following properties:

i. For any $n$, $r(P, P) \ge r(P, Q_n)$;

ii. If $n > m$, then $r(P, Q_n) \le r(P, Q_m)$;

iii. The sequence $(r(P, Q_n))$ converges.

Proof.

i. Since $f$ is non-increasing in $Dom(f) \backslash [0, E[P]]$ and $E[Q_n] \ge E[P] (I_P(n) \ge 0, \forall n \in \mathbb{N})$, we have that $f(E[Q_n]) \le f(E[P])$. Since g is non-increasing and $d(P, Q_n) \ge d(P, P)$, we have that $g(d(P, Q_n)) \le g(d(P, P))$. Therefore, fixed $0 \le \alpha \le 1$, with:

$$r(P, P) = \alpha f(E[P]) + (1-\alpha)g(d(P, P)) \ge \alpha f(E[Q_n]) + (1-\alpha)g(d(P, Q_n)) = r(P, Q_n).$$

ii. If n>m, then $E[Q_n] > E[Q_m]$e $d(P, Q_n) > d(P, Q_m)$. So, $f(E[Q_n]) \le f(E[Q_m])$ and $g(d(P, Q_n) \le g(d(P, Q_m)$. Therefore, fixed $0 \le \alpha \le 1$, with:

$$r(P, Q_n) = \alpha f(E[Q_n]) + (1-\alpha)g(d(P, Q_n)) \le \alpha f(E[Q_m]) + (1-\alpha)g(d(P, Q_m)) = r(P, Q_m)$$

iii. Since $1 \ge r(P, Q_n) \ge -1, \forall n \in \mathbb{N}$, and by item ii. $(r(P, Q_n))$ is monotone. By Theorem I, $(r(P, Q_n))$ converges.

The item i. of Theorem II guarantees that delivering services with parameter values worse than what was agreed in the SLA, results in receiving worse rewards. Item ii. of Theorem II states that providers that deliver services with parameter values closer to the agreed in SLA receive better rewards than providers that deliver the service with parameter values better than the agreed.

C.2 Example Use Case

Following, a scenario is described where an embodiment of a reward function can be applied. In particular, suppose the execution of an auction to decide which provider will be the winner that will meet a user requirement for an SFC. This can be understood as the first step of the lifecycle of SLA management. With the conclusion of the auction, a provider is selected, and the following steps of the lifecycle are performed, starting with the SLA definition, in which the provider and the user agree on the following QoS parameters:

Availability:

$$f: \mathbb{R}^+ \to [-1, 0]$$

$$f(E[Q]) = \begin{cases} 1, & E[Q] \le E[P] \\ -2, & E[P] < E[Q] \end{cases}$$

$$g: [0.1] \to [0, 1]$$

$$g(d(P, Q)) = -d(P, Q) + 1$$

With α=0.5 an embodiment may have the following reward function:

$$r(P,Q)=\begin{cases}\frac{1}{2}(2-d(P,Q)), & E[Q]\le E[P]\\ -\frac{1}{2}(d(P,Q)+1), & E[P]<E[Q]\end{cases}$$

LATENCY:

$$f:[0,2E[P]]\to[-1,1]$$

$$f(E\,|\,Q])=\begin{cases}\frac{-(E[Q]-E[P])^2}{E[P]^2}+1, & E[Q]\le E[P]\\ \frac{-(E[Q]-E[P])^2}{E[P]^2}-1, & E[P]<E[Q]\end{cases}$$

$$g:[0,1]\to[0,1]$$

$$g(d(P,Q))=-d(P,Q)^2+1$$

With α=0.5, an embodiment may have the following reward function:

$$r(P,Q)=\begin{cases}\frac{1}{2}\left(\frac{-(E[Q]-E[P])^2}{E[P]^2}-d(P,Q)^2+2\right), & E[Q]\le E[P]\\ \frac{1}{2}\left(\frac{-(E[Q]-E[P])^2}{E[P]^2}-d(P,Q)^2\right), & E[P]<E[Q]\le t\\ -1, & t<E[Q]\end{cases},$$

where $t=E[P]\sqrt{2-d(P,Q)^2}+E[P]$.

FIG. 1 shows plots 100 and 102 of the reward functions, for the availability and latency parameters, respectively. Note that an embodiment may use the mean value of the delivered distribution and the calculated distance between the distributions to define the reward function and its domain. This makes the reward function according to one embodiment adaptable and customizable for different scenarios.

Figure 2:
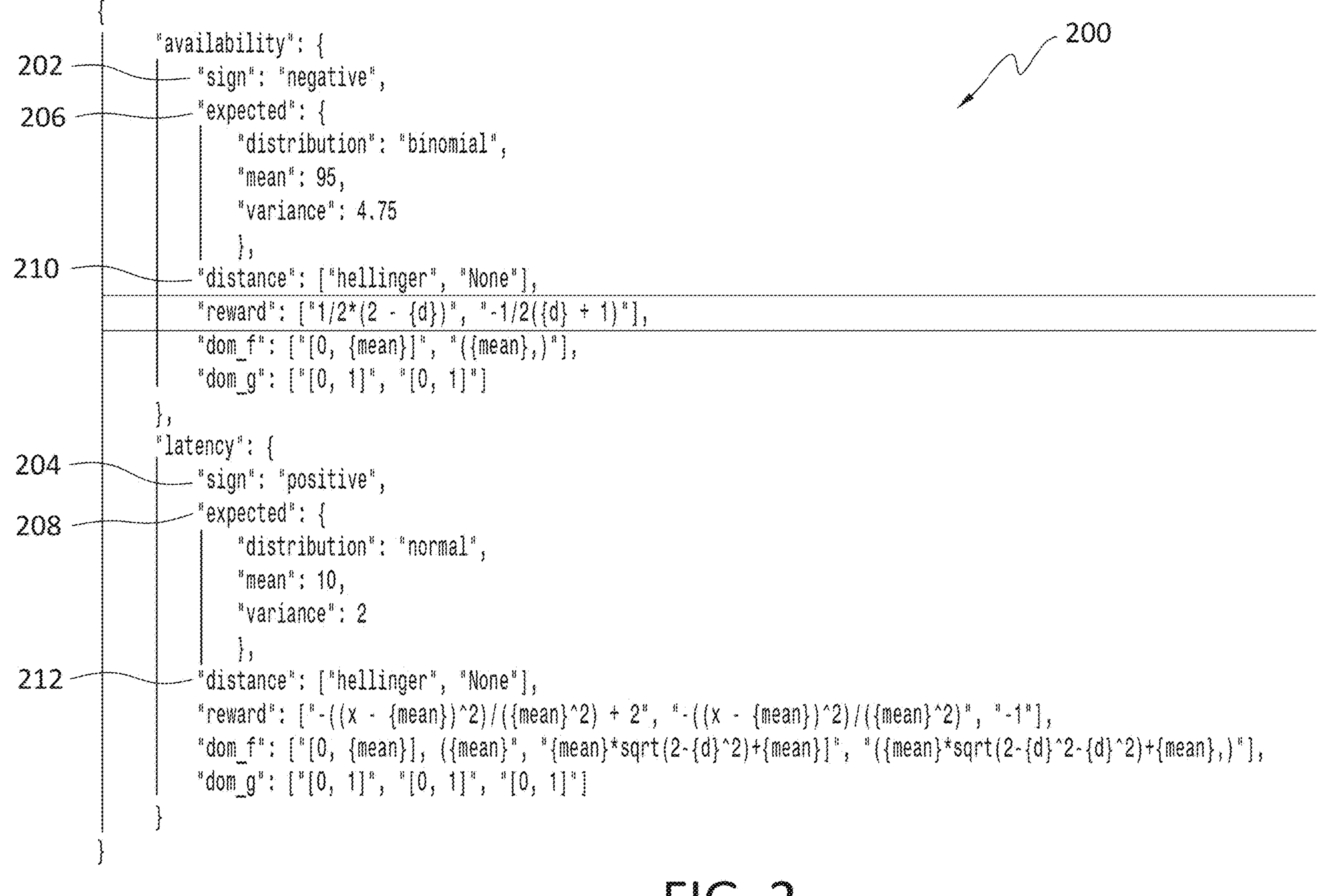
FIG. 2 discloses aspects of an example structure of QoS parameters, according to one embodiment.

FIG. 2 illustrates an example of a structure 200 of QoS parameters. In particular, the key "sign" 202 and 204 indicates whether the value given as a reward for the provider reputation will be the r(P, Q) value itself (when "positive") or if it will be −r(P, Q) (when "negative"). The key value varies according to the measured QoS parameter. When delivering services with parameters values better than the specified in SLA, an embodiment may define the value of the key "sign" as "positive," otherwise, when the parameters values are worse, an embodiment may define the value of the key "sign" as "negative."

With continued reference to the example of FIG. 2, the "expected" keys 206 and 208 refer to the expected probability distribution for a given QoS parameter. In our example, the provider and user agreed on a binomial distribution for the availability parameter, and a normal one for the latency parameter. Note that restriction (B), together with properties (2) and (3), may imply the discontinuity of function *f*. So, *f* is piecewise defined, implying that r is also piecewise defined.

Finally, the "distance" keys 210 and 212 represent which probability distance function d will be used to calculate the reward function. Since the reward function in this embodiment requires that $m(d)\subset[0,1]$, a function may also be chosen to normalize the distance function on the interval [0, 1]. In this example, the Hellinger distance function already satisfies the requirement, so an embodiment may set the norm function to "None."

D. Further Discussion

As disclosed herein, an embodiment may possess various useful features and aspects, although no embodiment is required to possess any of such useful features and aspects. One embodiment comprises a method for computing and assigning a reputation metric to the behavior of providers in terms of compliance of observed QoS parameters during a service provisioning, in comparison with values agreed in the SLA. The example method includes an innovative reputation mechanism based on the average of QoS parameters and the divergence of distributions, weighted according to a certain parameter.

The following features and aspects are illustrative, but not exhaustive. An embodiment may comprise, define and implement, a reputation mechanism based on distribution divergence and expected value. Particularly, an embodiment may use the divergence of distributions to calculate how much a provider is diverging from the expected QoS parameter behavior agreed to in a SLA and, the specific mean of each QoS parameter. An embodiment may comprise, define and implement, a fine-tuned reputation mechanism with weighted metric. Particularly, an embodiment may use a fine-tuned metric to provide a customizable reputation mechanism and decide how important each component of the metric is. The following discussion provides further details concerning these example embodiments.

D.1 Reputation Mechanism Based on Distribution Divergence and Expected Values Considering the competitive environment of Edge computing with autonomous InPs, an embodiment comprises a reputation mechanism built on an approach based on the divergence of the distributions of QoS parameters and their expected values. The mechanism enables setting a reputation metric obtained from the comparison of the sample distribution of the observed QoS parameters and the estimated probabilistic distribution of such parameters stipulated in SLA. With this, an embodiment may positively punctuate for providers that follow the agreed distribution and give less reward for the providers that presents performance levels away from the desired or even violate SLA. Hence, an embodiment may comprise an intelligent mechanism that can capture the changes in the behavior of providers in terms of meeting agreed QoS parameters. Such a reputation mechanism may be provided as part of an SLA management system and used in several of the activities involved.

D.2 Fine-Tuned Reputation Mechanism with Weighted Metric

During the service provisioning by the provider, both the available provider resources and user demands may vary over time. Such an ever-changing environment requires flexible and customizable mechanisms to cover its needs. Thus, an embodiment comprises a customizable and fine-tuned reputation mechanism that can adjust to both the particular demands of user applications, and provider service delivery performance by weighting the more important terms to compound a reputation metric. Through such customization and fine-tuning, providers and users can agree on the most appropriate weights for the composition of the reputation, and improve the decision-making process of rewarding the service delivery performance of a provider.

With this, users can benefit from having flexibility and better services due to the consequent competition among providers.

E. Aspects of One Example Architecture

Figure 3:
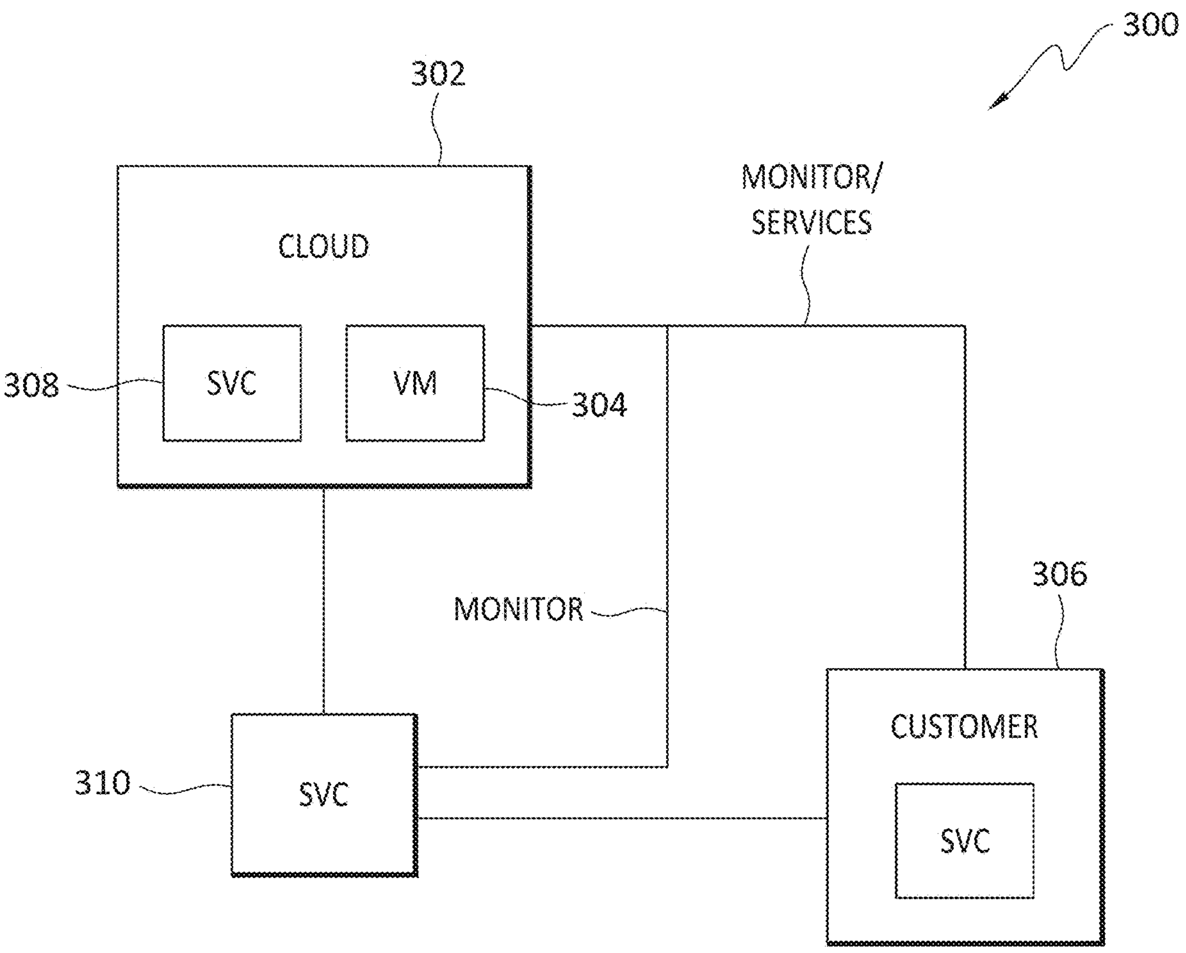
FIG. 3 discloses an example architecture according to one embodiment.

With attention now to FIG. 3, an example architecture 300 is disclosed. A service that implements some or all aspects of the disclosed functionalities, including the reputation mechanism functionalities, may be deployed in various ways. For example, a cloud computing site 302 may comprise entities such as VMs (virtual machines) 304 and other virtualized resources that may be able to provide services to a customer 306, such as an edge system or device. In connection with the provision of such services, an instance of a service 308 including a reputation mechanism 308 may be hosted at the cloud computing site 302. In this way, the cloud computing site 302 may be able to self-evaluate the extent to which the services provided to the customer 306 conform, or not, to an SLA in place between the cloud computing site 302 and the customer. Where the service 308 determines, such as through a monitoring process, that QoS requirements of the SLA are not being met, the cloud computing site 302 may automatically adjust the services being provided to the customer 306 until those services are back within the SLA requirements. As well, the service 308 may generate a reputation rating for the cloud computing site 302 and publish the reputation rating for the customer 306, and others, to access.

In an embodiment, a service 310, providing, possibly as-a-Service (aaS) to the customer 306, any of the functionalities disclosed herein, may take the form of a stand-alone platform. In this configuration, the service 310 may monitor services provided to the customer 306 by the cloud computing site 302, or other service provider(s). The service 310 may generate and publish a reputation rating for the cloud computing site 302. As well, the service 310 may provide an input to the cloud computing site 302 to indicate to the cloud computing site 302 which services are deficient and require improvement to meet SLA requirements.

In an embodiment, an instance of a service 312 may be hosted at the customer 306. As in the cases of the other implementations 308 and 310 of a service, the service 312 may monitor services provided to the customer 306 by the cloud computing site 302, or other service provider(s). The service 312 may generate and publish a reputation rating for the cloud computing site 302. As well, the service 312 may provide an input to the cloud computing site 302 to indicate to the cloud computing site 302 which services are deficient and require improvement to meet SLA requirements.

F. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 4:
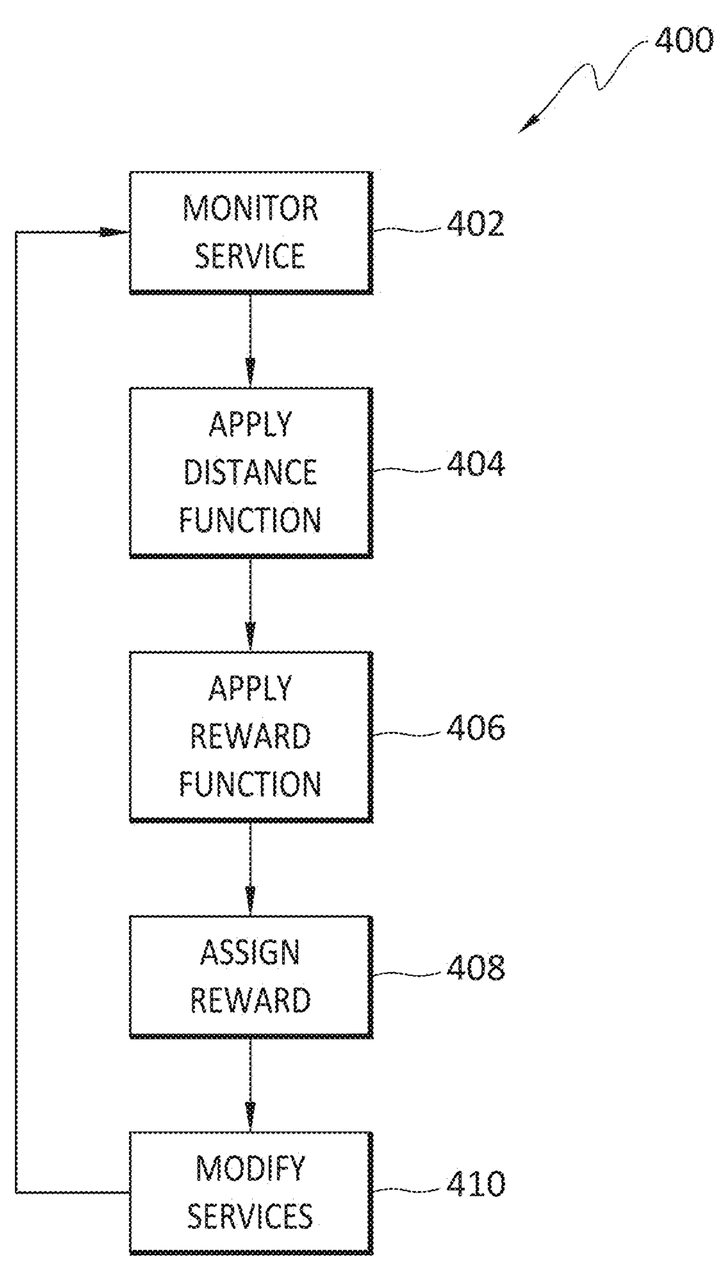
FIG. 4 discloses an example method according to one embodiment.

Directing attention now to FIG. 4, a method 400 according to one embodiment is disclosed. The example method 400 may be performed in whole, or in part, by a variety of entities including, but not limited to, the entities 308, 310, and 312 disclosed in FIG. 3.

The example method 400 may begin with monitoring 402 computing services provided by a network service provider to a customer comprising an edge system or device. Data concerning the services may be gathered as part of the monitoring process, and stored.

A distance function may be applied 404 to the data to determine to what extent, if any, the provided computing services diverge from computing services specified for the customer, as defined by a QoS specified by the customer. Application 404 of the distance function may reveal that the provided services meet the QoS requirements, or may indicate that the services do not meet the QoS requirements and also indicate the extent to which the provided services diverge from the services in the QoS requirements.

Based on an outcome of the application 404 of the distance function, a reward function may be applied 406 to determine, depending on results of application of the distance function, a reward for the network service provider. The reward may be positive, negative, or neutral. For example, if application 404 of the distance function indicates that the provided services do not meet the QoS requirements, the reward may be negative, and if application 404 of the distance function indicates that the provided services do meet the QoS requirements, the reward may be positive. In any case, the reward may then be assigned 408 to the network service provider.

Finally, where the provided services fail to meet the QoS requirements, application of the distance function 404 may automatically trigger an adjustment, or replacement, of a service to the customer. For example, network traffic may be rerouted to improve latency performance for the customer. As another example, customer access to processing power may be improved or expanded.

G. Further Example Embodiments

Following are some further example embodiments. These are presented only by way of example and are not intended to limit the scope of this disclosure or the claims in any way.

Embodiment 1. A method of improving provision of computing services provided to a customer by a computing services provider, comprising: monitoring computing services provided by a computing services provider to a customer comprising an edge system that comprises hardware and/or software; gathering data concerning the computing services received by the customer; applying a distance function to the data to determine to what extent, if any, the computing services diverge from computing services specified for the customer, as defined by a QoS (Quality of Service) parameter of an SLA (service level agreement) agreed upon by the customer and the computing services provider; based on results of the applying of the distance function, applying a reward function to determine a reward for the computing services provider; and when applying of the distance function indicates that the computing services provided to the customer do not meet the computing services specified in the QoS requirement, automatically triggering a change in the computing services provided to the customer.

Embodiment 2. The method as recited in any preceding embodiment, wherein the reward has a positive value when the QoS requirement is met, and the reward has a negative value when the QoS requirement is not met.

Embodiment 3. The method as recited in any preceding embodiment, wherein assignment of the reward to the computing services provider affects a reputation score associated with the computing services provider.

Embodiment 4. The method as recited in any preceding embodiment, wherein applying the distance function comprises comparing a sample distribution of observed Qos parameters with an estimated probabilistic distribution of QoS parameters of the agreed upon SLA.

Embodiment 5. The method as recited in any preceding embodiment, wherein respective weights of QoS parameters of the agreed upon SLA are adjustable, on the fly as customer needs for computing services change, by the customer and/or by the computing services provider.

Embodiment 6. The method as recited in any preceding embodiment, wherein the reward function, and its domain, are defined by a mean value of a delivered distribution of Qos parameters, and a calculated distance between a sample distribution of observed Qos parameters and an estimated probabilistic distribution of QoS parameters of the agreed upon SLA.

Embodiment 7. The method as recited in any preceding embodiment, wherein the computing services received by the customer comprise an SFC (service function chain) that includes chained VNFs (virtualized network functions).

Embodiment 8. The method as recited in any preceding embodiment, wherein the computing services provided by the computing services provider to the customer comprises deploying and instantiating the computing services, which comprise one or more functions, on the customer.

Embodiment 9. The method as recited in any preceding embodiment, wherein the reward indicates an extent to which the computing services provided by the computing services provider conform, or not, to QoS parameters of the agreed upon SLA.

Embodiment 10. The method as recited in any preceding embodiment, wherein the reward function and/or the distance function are modifiable to accommodate changing circumstances in an edge computing environment where the customer resides.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 5:
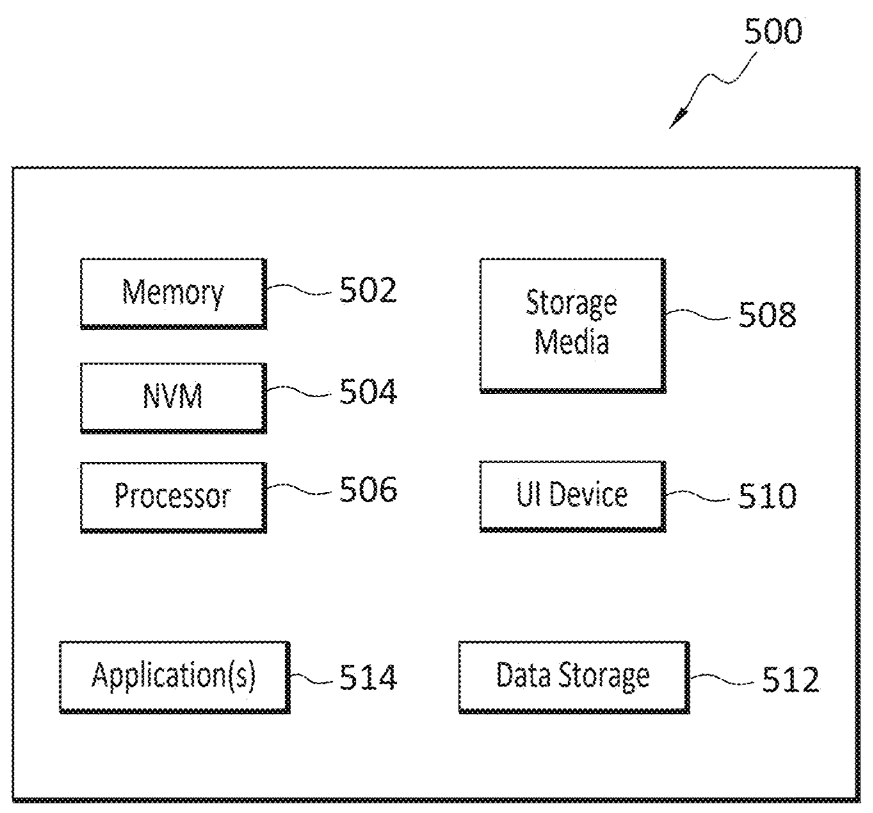
FIG. 5 discloses an example computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method of improving provision of computing services provided to a customer by a computing services provider, comprising:

monitoring computing services provided by a computing services provider to a customer comprising an edge system that comprises hardware and/or software;

gathering data concerning the computing services received by the customer;

applying a distance function to the data to determine to what extent, if any, the computing services diverge from computing services specified for the customer, as defined by a QoS (Quality of Service) requirement of an SLA (service level agreement) agreed upon by the customer and the computing services provider, wherein applying the distance function comprises comparing a sample distribution of observed QoS parameters with an estimated probabilistic distribution of QoS parameters of the agreed upon SLA;

based on results of the applying of the distance function, applying a reward function to determine a value for the computing services provider, wherein the reward function assigns a negative value when observed QoS parameter values deviate from QoS values specified in the SLA, regardless of whether the deviation is above or below the specified QoS values, such that delivery of QoS values that outperform the specified QoS values is not rewarded, and wherein assignment of the value to the computing services provider affects a reputation score associated with the computing services provider; and when applying of the distance function indicates that the computing services provided to the customer do not meet the computing services specified in the QoS requirement, automatically triggering a change in the computing services provided to the customer.

2. The method as recited in claim 1, wherein the value has a positive value when the QoS requirement is met, and the value has the negative value when the QoS requirement is not met.

3. The method as recited in claim 1, wherein respective weights of Qos parameters of the agreed upon SLA are adjustable, on the fly as customer needs for computing services change, by the customer and/or by the computing services provider.

4. The method as recited in claim 1, wherein the reward function, and its domain, are defined by a mean value of a delivered distribution of QoS parameters, and a calculated distance between a sample distribution of observed QoS parameters and an estimated probabilistic distribution of QoS parameters of the agreed upon SLA.

5. The method as recited in claim 1, wherein the computing services received by the customer comprise an SFC (service function chain) that includes chained VNFs (virtualized network functions).

6. The method as recited in claim 1, wherein the computing services provided by the computing services provider to the customer comprises deploying and instantiating the computing services, which comprise one or more functions, on the customer.

7. The method as recited in claim 1, wherein the value indicates an extent to which the computing services provided by the computing services provider conform, or not, to QoS parameters of the agreed upon SLA.

8. The method as recited in claim 1, wherein the reward function and/or the distance function are modifiable to accommodate changing circumstances in an edge computing environment where the customer resides.

9. A non-transitory storage medium having stored therein instructions that are executable by one or more hardware processors to perform operations for improving provision of computing services provided to a customer by a computing services provider, and the operations comprising:

monitoring computing services provided by a computing services provider to a customer comprising an edge system that comprises hardware and/or software;

gathering data concerning the computing services received by the customer;

applying a distance function to the data to determine to what extent, if any, the computing services diverge from computing services specified for the customer, as defined by a QoS (Quality of Service) requirement of an SLA (service level agreement) agreed upon by the customer and the computing services provider, wherein applying the distance function comprises comparing a sample distribution of observed QoS parameters with an estimated probabilistic distribution of QoS parameters of the agreed upon SLA;

based on results of the applying of the distance function, applying a reward function to determine a value for the computing services provider, wherein the reward function assigns a negative value when observed QoS parameter values deviate from QoS values specified in the SLA, regardless of whether the deviation is above or below the specified QoS values, such that delivery of QoS values that outperform the specified QoS values is not rewarded, and wherein assignment of the value to the computing services provider affects a reputation score associated with the computing services provider; and when applying of the distance function indicates that the computing services provided to the customer do not meet the computing services specified in the QoS requirement, automatically triggering a change in the computing services provided to the customer.

10. The non-transitory storage medium as recited in claim 9, wherein the value has a positive value when the QoS requirement is met, and the value has the negative value when the QoS requirement is not met.

11. The non-transitory storage medium as recited in claim 9, wherein respective weights of QoS parameters of the agreed upon SLA are adjustable, on the fly as customer needs for computing services change, by the customer and/or by the computing services provider.

12. The non-transitory storage medium as recited in claim 9, wherein the reward function, and its domain, are defined by a mean value of a delivered distribution of Qos parameters, and a calculated distance between a sample distribution of observed Qos parameters and an estimated probabilistic distribution of QoS parameters of the agreed upon SLA.

13. The non-transitory storage medium as recited in claim 9, wherein the computing services received by the customer comprise an SFC (service function chain) that includes chained VNFs (virtualized network functions).

14. The non-transitory storage medium as recited in claim 9, wherein the computing services provided by the computing services provider to the customer comprises deploying and instantiating the computing services, which comprise one or more functions, on the customer.

15. The non-transitory storage medium as recited in claim 9, wherein the value indicates an extent to which the computing services provided by the computing services provider conform, or not, to QoS parameters of the agreed upon SLA.

16. The non-transitory storage medium as recited in claim 9, wherein the reward function and/or the distance function are modifiable to accommodate changing circumstances in an edge computing environment where the customer resides.

17. A computer system comprising:

one or more processors; and one or more non-transitory storage devices that store instructions that are executable by the one or more processors to cause the computer system to:

monitor computing services provided by a computing services provider to a customer comprising an edge system that comprises hardware and/or software;

gather data concerning the computing services received by the customer;

apply a distance function to the data to determine to what extent, if any, the computing services diverge from computing services specified for the customer, as defined by a QoS (Quality of Service) requirement of an SLA (service level agreement) agreed upon by the customer and the computing services provider, wherein applying the distance function comprises comparing a sample distribution of observed QoS parameters with an estimated probabilistic distribution of QoS parameters of the agreed upon SLA;

based on results of the applying of the distance function, apply a reward function to determine a value for the computing services provider, wherein the reward function assigns a negative value when observed QoS parameter values deviate from QoS values specified in the SLA, regardless of whether the deviation is above or below the specified QoS values, such that delivery of QoS values that outperform the specified QoS values is not rewarded, and wherein assignment of the value to the computing services provider affects a reputation score associated with the computing services provider; and when applying of the distance function indicates that the computing services provided to the customer do not meet the computing services specified in the QoS requirement, automatically trigger a change in the computing services provided to the customer.

18. The computer system of claim 17, wherein the value has a positive value when the QoS requirement is met, and the value has the negative value when the QoS requirement is not met.

19. The computer system of claim 17, wherein respective weights of QoS parameters of the agreed upon SLA are adjustable, on the fly as customer needs for computing services change, by the customer and/or by the computing services provider.

20. The computer system of claim 17, wherein the reward function, and its domain, are defined by a mean value of a delivered distribution of QoS parameters, and a calculated distance between a sample distribution of observed QoS parameters and an estimated probabilistic distribution of QoS parameters of the agreed upon SLA.

* * * * *